United States Patent [19]
Lachenmayer

[11] 3,726,320
[45] Apr. 10, 1973

[54] TUBULAR CONSTRUCTION ARRANGEMENT

[75] Inventor: Wilhelm Lachenmayer, Berlebeck, Germany

[73] Assignee: Benteler-Werke AG, Krs. Paderborn, Schloss, Neuhaus, Germany

[22] Filed: Feb. 14, 1972

[21] Appl. No.: 226,006

Related U.S. Application Data

[62] Division of Ser. No. 865,283, Oct. 10, 1969.

[30] Foreign Application Priority Data

Nov. 26, 1968 Germany..................P 18 10 957.4

[52] U.S. Cl.................138/103, 138/96 R, 285/331, 285/398
[51] Int. Cl...............................................F16l 55/00
[58] Field of Search................285/371, 398, 331, 285/119; 138/96 R, 89, 91, 103

[56] References Cited
UNITED STATES PATENTS 2,035,978  3/1936  Parker....................285/331
3,188,117  6/1965  Press et al. ............285/398

Primary Examiner—Dave W. Arola
Attorney—Michael S. Striker

[57] ABSTRACT

A tubular construction arrangement in which the open ends of at least two elongated tubular members are closed by cup-shaped members having flange portions overlying and abutting against radial endfaces of the tubular members. A pair of opposite axially extending portions of an alignment and spacing member are respectively fitted into the cup-shaped members closing adjacent ends of the tubular members to substantially align the latter, and the alignment and spacing member has a central radial enlargement which is sandwiched between the flange portions of the cup-shaped members. An insulating jacket surrounds the tubular members, the flange portions of the cup-shaped members and the enlargement of the alignment and spacing member.

10 Claims, 3 Drawing Figures

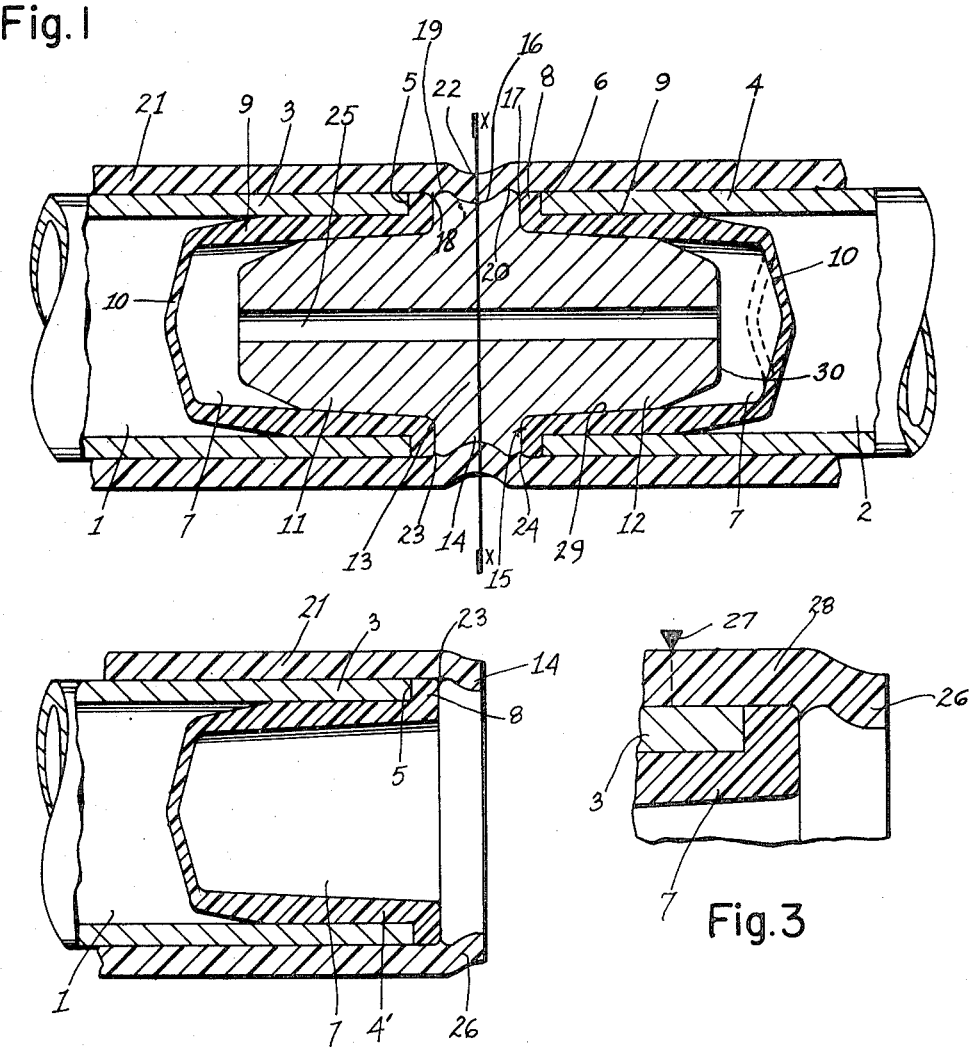

TUBULAR CONSTRUCTION ARRANGEMENT

CROSS REFERENCES TO RELATED APPLICATIONS

The present application is a divisional application of the copending application Ser. No. 865,283, filed Oct. 10, 1969.

BACKGROUND OF THE INVENTION

The present invention relates to a tubular construction especially adapted for use in heat-and-water installation applications and which incorporates an elongated tubular member provided with a heat-and-sound insulating jacket and corrosion-resistant protective plugs received in the open ends of the elongated tubular member.

Tubular constructions are known in which the interior of a metal tubular member is sealed from the atmosphere by means of stoppers plugged into the open ends of the tubular member.

Such conventional stoppers, however, have the disadvantage that they insufficiently protect the respective end sections of the tubular member against physical damage, for example during storage and transportation thereof, and that they are too easily disconnectable from these end sections and are lost, for example during mechanical lifting of the tubular member at the plugged ends thereof, with the result that the interior of the metal tubular member then is subjected to corrosion due to atmospheric influences.

SUMMARY OF THE INVENTION

The object of the present invention is to overcome the above disadvantages and to provide a tubular construction arrangement comprising at least two elongated tubular members, made of metal, such as steel and having each at least one open end and a radial endface surrounding the open end. The tubular members are substantially aligned with each other along a common axis with the open ends spaced from and facing each other. A pair of cup-shaped insert means are tightly inserted into the open ends to close the same. The cup-shaped insert means have annular portions respectively overlying the radial endfaces of the two tubular members and being axially spaced from each other. The arrangement comprises further an alignment and spacing member having a pair of opposite axially extending portions respectively fitted into the cup-shaped insert means and a radially extending enlargment between the aforementioned opposite portions and substantially filling the space between the annular portions of the two insert means, and jacket means surrounding the tubular members, the annular portions of the insert means and the enlargement of the alignment in spacing member.

The novel features which are considered characteristic for the invention are set forth in particular in the appended claims. The invention itself, however, both as to its method of operation, together with additional objects and advantages, will be best understood from the following description of specific embodiments when read in connection with the accompanying drawing.

BRIEF DESCRIPTION OF THE DRAWING

FIG. 1 in part, shows a longitudinal cross-sectional view of opposing end portions of a pair of elongated tubular members, and illustrates the manner of manufacturing a plug construction for tubular members in accordance with the present invention.

FIG. 2 shows a part cross-sectional view of the end portion of a tubular member provided with a plug construction according to FIG. 1; and FIG. 3, in part, shows a cross-sectional view of the sealing connection between the plug construction of FIG. 1 and an insulating jacket surrounding the tubular members of FIGS. 1 and 2.

DESCRIPTION OF THE PREFERRED EMBODIMENT

Referring now to the drawings in which like reference numerals index like parts, and with attention initially directed to FIG. 1, a pair of axially aligned elongated tubular members 1 and 2, made of metal, such as steel, and for example continuously made, such as by drawing or any other conventional manner, are seen to comprise opposing end portions 3 and 4 each having a radial end face 5 and 6.

Pressed into the respective end portions 3 and 4 are identical substantially cup-shaped hollow plugs 7, made of a corrosion-resistant material, such as synthetic plastic. The plugs 7 are axially aligned in the direction of elongation of the tubular members 1 and 2, and each includes an open end with a circumferential flange portion 8 which surrounds the open end, a circumferential wall 9, and a bottom or end wall 10.

The flange portions 8 overlie the radial end faces 5 and 6 in abutting engagement and have an outer diameter which is substantially equal to the outer diameter of the tubular members 1 and 2.

The inner surfaces of the circumferential walls 9 are symmetrically conically tapered in direction toward the end walls 10 and are seen to be of a thickness considerably larger than the thickness of the end walls 10 which, preferably, are slightly tapered or curved in direction away from the open ends of the plugs.

In direction towards the end walls 10 and away from the open ends of the plugs, the outer surfaces of the circumferential wall 9 are slightly inwardly bent so as to facilitate insertion of the plugs into the respective open ends.

Interconnecting the tubular members 1 and 2, and pressed into the respective hollow interiors of the plugs 7, are opposite arms 11 and 12 of a symmetrical alignment and spacing member, generally indicated at 13. Intermediate the opposite arms 11 and 12 of the alignment and spacing member 13, is an annular circumferential enlargement 14 having side walls 15 in direction of which the tubular members 1 and 2 are axially moved till the flange portions 8 firmly abut against these side walls and are spaced from each other by a width corresponding to the width of the enlargement 14.

The arms 11 and 12 have circumferential walls 29 and end walls 30. As shown, the circumferential walls 29 are conically tapered to a degree substantially corresponding to the conicity of the inner surfaces of the plugs 7. However, towards the end walls 30, the arms 11 and 12 are more acutely tapered than the remainder of the circumferential wall so as to facilitate insertion of the arms into the respective plugs.

Due to their corresponding conicity, the arms 11 and 12 firmly press the adjoining wall portions of the plugs 7 against adjacent wall portions of the inner surfaces of the tubular members 1 and 2.

The enlargement 14 along its outer circumference, is arranged with a substantially inwardly curved groove 16 which arcuately extends across substantially the entire width of this outer circumference and forms a constriction in the same.

Flanking the groove 16 at opposite sides thereof, are additional circumferential grooves 17 and 18 which extend radially inwardly and are formed upon abutting engagement of the flange portions 8 with their respective side wall 15 of the enlargement 14 and are defined by the space in between the apices of the sloping ridges 19 and 20, which bound the width of the groove 16, and adjoining opposite portions of the outer circumference of the circumferential flange portions 8, as shown in the drawings.

The circumferential grooves 17 and 18 are shown as having a substantially triangular configuration, however, it will be understood that these grooves may have any other suitable shape.

The tubular members 1 and 2 thus closed by the plugs 7 and axially aligned and spaced with respect to each other by the alignment and spacing member 13, are then provided with an heat-and-sound insulating jacket 21 which preferably consists of a layer of synthetic plastic material applied over the circumference of the tubular members.

This application or deposition of the layer material is carried out under elevated temperature, preferably, and for example, in an extruder which has a nozzle portion through which a plurality of tubular elements, interconnected, aligned and spaced as hereinbefore described, are sequentially conveyed so as to obtain an overall even and tight adherence of the layer material to the tubular members.

The jacket 21 is continuously applied over the axially aligned tubular members 1 and 2, including the transition between the flange portions 8 constituted by the enlargement 14.

During deposition of the layer material or jacket 21, a constriction 22 is formed therein at the location of the enlargement 14 as a result of the constriction formed by the groove 16 in the outer circumference of the enlargement.

Also by applying this layer over the circumference of the tubular members 1 and 2 and the transition therebetween, two parallel radially inwardly extending circumferential beads 23 and 24 are formed in the radially inwardly extending circumferential grooves 17 and 18. Due to the elevated temperature under which the jacket 21 is applied, the circumferential beads 23 and 24 are automatically welded to the adjoining portions of the flange portions 8 so as to form an hermetic seal between the plugs 7 and the jacket 21.

During passage of the respective tubular members through the nozzle of the extruder in order to be coated with the jacket 21, increase in volume of air occurs in the respective tubular members and the interiors of the plugs 7.

To this end, a pressure-equalizing channel 25 is provided in the alignment and spacing member 13. As shown, this channel 25 extends axially through the alignment and spacing member 13 and intercommunicates the respective interiors of the plugs 7.

Expansion of air in the tubular member 1 causes the thin end wall 10 of the left-hand plug 7 to bend inwardly in direction of the open end of the plug.

This pressure by the expanded air on the end wall 10, in turn causes the air entrapped within the interior of the left-hand plug to flow through the channel 25 and into the interior of the right-hand plug.

Consequently, expansion of air in the tubular member 2 causes the thin wall 10 of the right-hand plug to bend inwardly as a result of which the air entrapped within the interior of the plus is caused to flow through the channel 25 and into the interior of the left-hand plug.

It will be appreciated, that even though only two tubular members have been illustratively and exemplary shown, it lies within the scope of the present invention that a great number of tubular elements may be interconnected, aligned and spaced relative to each other and provided with an insulating jacket and closure members in the manner as hereinbefore described.

It will further by appreciated that each tubular member is provided at both ends with plug members as hereinbefore described.

Following deposition of the layer material, the tubular members 1 and 2 are disconnected from each other by severing the jacket 21 along a path defined in the constriction 22 in the jacket and by subsequent removal of the arms 11 and 12 from their respective plugs 7.

The end product obtained is diagrammatically illustrated in FIG. 2.

Shown therein, is the end portion 3 of the tubular member 1 provided with the plug 7 whose flange portion 8 abuttingly overlies the radial end face 5. Locking the flange portion 8 in the position as shown, is the circumferential radially inwardly extending bead 23 of the jacket 21, which abuts against and is sealed with the adjoining portion of the flange portion 8.

In the manner described, the exterior surface of the tubular member is protected by the jacket 21 while the interior of the tubular member is protected against corrosion by the hermetic seal constituted by the flange portion 8 of the plug 7 and the bead 23.

In addition, the end portions of the tubular member have become shock-absorbent as a result of the substantially radially inwardly extending portions 26 of the jacket 21.

FIG. 3 illustratively shows the manner in which the plug 7 may be removed from the tubular member.

Prior to using the tubular member, for example prior to welding or soldering of the respective end portions, the jacket 21, at the location indicated by the arrow 27, may be circumferentially cut by a mechanical cutting device, such as a knife, saw or the like.

Removal of the end portion 28 of the jacket 21 permits subsequent removal of the plug 7 from the end portion 3 of the tubular member.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is:

1. An arrangement of the character described comprising at least two elongated tubular members having each at least one open end and a radial endface surrounding said open end, said tubular members being substantially aligned with each other along a common axis with the open ends spaced from and facing each other; a pair of cup-shaped insert means closing said open ends and having annular portions respectively overlying the radial endfaces of said two tubular members and being axially spaced from each other; an alignment and spacing member having a pair of opposite axially extending portions respectively tightly fitted into said cup-shaped insert means and a radially extending enlargement between said opposite portions and substantially filling the space between said annular portions of said insert means; and jacket means surrounding and tightly engaging said tubular members, said annular portions of said insert means and said enlargement of said alignment and spacing member.

2. An arrangement as defined in claim 1, including an outer annular bevel on the annular portion of each insert means and a pair of complementary annular bevels on said radially extending enlargement forming with the bevels on said annular portions a pair of grooves, portions of said jacket means filling said grooves and forming radially inwardly extending circumferential beads sealed to said annular portions.

3. An arrangement as defined in claim 2, and including a bore extending axially through said alignment and spacing member.

4. An arrangement as defined in claim 1, wherein each of said cup-shaped insert means has a peripheral wall tightly engaging the inner surface of the respective tubular member and an endwall in the tubular member spaced from the endface thereof.

5. An arrangement as defined in claim 4, wherein the inner surface of said peripheral wall tapers in direction toward said end wall so that said peripheral wall is at least in part tightly compressed between said inner surface and the respective axial extending portion of the alignment and spacing member.

6. An arrangement as defined in claim 5, wherein said insert means is made of synthetic plastic material.

7. An arrangement as defined in claim 4, wherein said endwall has a wall thickness substantially smaller than that of the peripheral wall.

8. An arrangement as defined in claim 6, wherein said endwall is curved in direction away from the annular portion of the insert means.

9. An arrangement as defined in claim 1, wherein the annular portions of said pair of insert means and said enlargement of said alignment and spacing member have substantially equal diameters.

10. An arrangement as defined in claim 1, wherein said enlargement of said alignment and spacing member is formed with a central circumferential groove, and wherein said jacket means extends with a portion thereof into said groove.

* * * * *